United States Patent
Moon et al.

(10) Patent No.: US 9,822,311 B2
(45) Date of Patent: Nov. 21, 2017

(54) METHOD FOR PREPARING SYNTHETIC FUEL FROM NATURAL GAS OF STRANDED GAS FIELD AND ASSOCIATED GAS FROM OIL AND GAS FIELDS BY GTL-FPSO PROCESS

(71) Applicant: KOREA INSTITUTE OF SCIENCE AND TECHNOLOGY, Seoul (KR)

(72) Inventors: Dong Ju Moon, Seoul (KR); Jae Sun Jung, Seoul (KR); Eun Hyeok Yang, Seoul (KR); Jae Suk Lee, Seoul (KR); Young Su Noh, Seoul (KR); Gi Hoon Hong, Seoul (KR); Sang Yong Lee, Seoul (KR); Sung Soo Lim, Seoul (KR); Na Young Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/951,857

(22) Filed: Nov. 25, 2015

(65) Prior Publication Data
US 2016/0186071 A1    Jun. 30, 2016

(30) Foreign Application Priority Data

Dec. 24, 2014  (KR) .................. 10-2014-0188289

(51) Int. Cl.
  *C10G 47/00*    (2006.01)
  *C10G 2/00*     (2006.01)
  *C01B 3/38*     (2006.01)

(52) U.S. Cl.
  CPC .............. *C10G 2/332* (2013.01); *C01B 3/382* (2013.01); *C10G 47/00* (2013.01);
  (Continued)

(58) Field of Classification Search
  CPC .......... C10G 47/00; C10G 2/332; C01B 3/382
  See application file for complete search history.

(56) References Cited

U.S. PATENT DOCUMENTS 5,728,918 A * 3/1998 Nay .................. B01J 23/75
                                                      502/50
2002/0024038 A1   2/2002 Iijima et al.
(Continued)

FOREIGN PATENT DOCUMENTS

JP        5424566 B2    12/2013
KR      100975390 B1     8/2010
(Continued)

OTHER PUBLICATIONS

Dry, M.E. (2002). "Fischer-Tropsch Synthesis-Industrial" in the Encyclopedia of Catalysis, Wiley-Interscience, 55 pgs.*
(Continued)

*Primary Examiner* — Brian McCaig
(74) *Attorney, Agent, or Firm* — Ladas & Parry LLP (57) ABSTRACT

The present invention relates to a method for preparing a synthetic fuel on a vessel above a stranded gas field or an oil & gas field by a GTL-FPSO process, more particularly to a method for preparing a synthetic fuel with superior economic feasibility, productivity and efficiency using a compact GTL (gas to liquid) apparatus that can be used for a stranded gas field or an oil & gas field and an FPSO (floating production, storage and offloading) process under a condition optimized for the ratio of carbon dioxide in the stranded gas field or the oil & gas field and an apparatus for the same.

9 Claims, 2 Drawing Sheets (52) U.S. Cl.
CPC ............... *C01B 2203/0233* (2013.01); *C01B 2203/0238* (2013.01); *C01B 2203/0244* (2013.01); *C01B 2203/0283* (2013.01); *C01B 2203/062* (2013.01); *C01B 2203/1241* (2013.01); *C01B 2203/1258* (2013.01)

(56) References Cited

U.S. PATENT DOCUMENTS

| | | |
|---|---|---|
| 2005/0106086 A1 | 5/2005 | Tomlinson et al. |
| 2008/0210596 A1 | 9/2008 | Litt et al. |
| 2011/0130474 A1* | 6/2011 | Moon .................. B01J 19/0093 518/702 |

FOREIGN PATENT DOCUMENTS

| | | |
|---|---|---|
| KR | 101152666 B1 | 6/2012 |
| KR | 101157205 B1 | 6/2012 |
| KR | 101272082 B1 | 6/2013 |

OTHER PUBLICATIONS

De Klerk, A. et al. (2010). Catalysis in the Refining of Fischer-Tropsch Syncrude, 1st ed, Royal Society of Chemistry, 294 pgs (Office action cites pp. 13 and 16-17).*

Dorner, R.W. et al. (2009) Energy & Fuels, 23, 4190-4195.*

* cited by examiner

METHOD FOR PREPARING SYNTHETIC FUEL FROM NATURAL GAS OF STRANDED GAS FIELD AND ASSOCIATED GAS FROM OIL AND GAS FIELDS BY GTL-FPSO PROCESS

CROSS-REFERENCE TO RELATED APPLICATIONS

This application claims, under 35 U.S.C. §119, the priority of Korean Patent Application No. 10-2014-0188289, filed on Dec. 24, 2014, in the Korean Intellectual Property Office, the disclosure of which is incorporated herein by reference in its entirety.

BACKGROUND

(a) Technical Field

The present invention relates to a method for preparing a synthetic fuel from a stranded gas field and associated gas from oil & gas fields by a GTL-FPSO process and an apparatus for the same, more particularly to a method for preparing a synthetic fuel with superior economic feasibility, productivity and efficiency using a GTL (gas to liquid) apparatus that can be used for a stranded gas field and associated gas from oil & gas fields and an FPSO (floating production, storage and offloading) process under a condition optimized for the ratio of carbon dioxide in the stranded gas field and associated gas from oil & gas fields and an apparatus for the same.

(b) Background Art

Due to the recent rapidly rising oil prices, it is estimated that over 80 billion dollars were spent in 2008 for oil import in Korea. With the concern of depletion of oil reservoirs, interest in alternative energy is increasing.

In particular, CNG/LNG, methanol, GTL, etc. are gaining spotlights because they utilize natural gas which is relatively abundant. Among the technologies of producing a synthetic fuel from the natural gas, the GTL (gas to liquid; conversion of gas to synthetic fuel) technology is drawing a lot of attentions as a new energy resource due to several advantages. The GTL technology can have two positive effects in environmental aspects.

GTL (gas to liquid) refers to a technology of producing a petroleum product in liquid state by chemically converting natural gas or the product. Since the synthetic petroleum product produced by the GTL technology passes through a desulfurization process, it is a clean fuel containing little sulfur and emitting less smoke, nitrogen oxides and greenhouse gases. A method of preparing a synthesis gas (syngas) consisting of hydrogen and carbon monoxide through reforming, preparing a $C_1$-$C_{100}$ hydrocarbon through Fischer-Tropsch reaction of the prepared synthesis gas and then producing a usable heavy oil product through hydrocracking and isomerization is known.

Also, there is known a GTL technology optimized for offshore environment, which is called the 'GTL-FPSO technology'. It is a hybrid technology of the GTL technology whereby a synthesis gas is prepared from a natural gas mainly consisting of methane and then a synthetic fuel is prepared therefrom and the FPSO which means a floating production, storage and offloading unit. This technique is suited for the natural gas of a stranded gas field and the associated gas of an oil field.

The worldwide gas reserves are estimated to be 6,000 tcf (=160 trillion cubic centimeters) and potential gas reserves are estimated to be 13,000 tcf. Among them, 75% are stranded gas fields and, 0.5-1.5 tcf of associated gas in stranded gas fields and oil fields which are not being developed for physical and economic reasons are drawing attentions.

But, for the GTL-FPSO technology to be applicable to the offshore environment, safety, facility size, process operability and reliability, cost, economic feasibility, etc. should be ensured. For example, use of oxygen in the offshore environment is associated with the safety issue, and the facilities involved in the processes under the offshore environment are regarded as similar to those for onshore processes but are different in terms of type, size and weight. Because the overall size of the FPSO is determined by the facility modules of 2000-3000 tons assembled together, the size and weight are important. In addition, because the process should be operated continuously year-round except the catalyst exchange time, process safety and reliability are important.

However, the development of infrastructures suitable for the offshore environment is very slow and the currently available GTL-FPSO technology is not enough to be optimized and practically used.

As the existing methods for preparing a synthetic fuel from a stranded gas field, Korean Patent Registration No. 10-1152666 discloses an apparatus and a method for obtaining a liquid synthetic fuel from a gas extracted from a stranded gas field or an associated gas extracted from an oil field using a GTL-FPSO apparatus including a reforming reactor and a liquid carbon compound preparing device equipped on a vessel through desulfurization, reforming, conversion, upgrading, etc. using a built-in power generator, and Korean Patent Registration No. 10-1157205 proposes a DME (dimethyl ether)-FPSO apparatus that can be used for a stranded gas field and a method for preparing dimethyl ether using the same, whereby dimethyl ether is obtained from a gas extracted from a stranded gas field using a DME-FPSO apparatus including a reforming reactor and a dimethyl ether reactor equipped on a vessel.

US Patent Publication No. 2008-210596, US Patent Publication No. 2002-24038, US Patent Publication No. 2005-106086, etc. also propose methods and apparatuses for preparing a synthetic fuel through reforming and Fischer-Tropsch reactions using GTL-FPSO apparatuses as similar systems to those of the above patents.

In addition, Korean Patent Registration No. 10-1272082 proposes use of different catalysts in a Fischer-Tropsch reactor depending on the compositional molar ratio ($H_2$/CO) of a synthesis gas supplied to the reactor, and Korean Patent Registration No. 10-975390 proposes a Fischer-Tropsch reaction apparatus consisting of a separate reactor in which a cobalt catalyst is provided and a reactor in which an iron-based catalyst is provided.

These existing technologies are common in that a synthetic fuel is prepared using a GTL-FPSO apparatus through reforming and Fischer-Tropsch reactions but they propose effective methods for preparing a synthetic fuel from a natural gas differing in associated processes or technical features.

However, since these technologies do not consider the difference in the gas components in stranded gas fields, the associated processes are ineffective and economic feasibility and productivity are insufficient. This often makes the preparation of a synthetic fuel less applicable or commercializable.

Accordingly, development of a more effective method for preparing a synthetic fuel from a natural gas is necessary.

REFERENCES OF THE RELATED ART

Patent Documents (Patent document 1) Korean Patent Registration No. 10-1152666.
(Patent document 2) Korean Patent Registration No. 10-1157205.
(Patent document 3) US Patent Publication No. 2008-210596.
(Patent document 4) US Patent Publication No. 2002-24038.
(Patent document 5) US Patent Publication No. 2005-106086.
(Patent document 6) Korean Patent Registration No. 10-1272082.
(Patent document 7) Korean Patent Registration No. 10-975390.

SUMMARY

The inventors of the present invention have studied for a long time to solve the above-described problems of the existing technologies. For this purpose, they have compared the GTL technology using a natural gas from a stranded gas field with the existing technologies using a natural gas. As a result, they have found out that a GTL-FPSO process for preparing a synthetic fuel using a synthesis gas prepared according to a process condition suited for the ratio of carbon dioxide included in a stranded gas field is very effective, economical and environment-friendly.

The present invention is directed to providing a method for preparing a synthetic fuel through a GTL-FPSO process according to a preparation condition optimized for the ratio of carbon dioxide included in a natural gas of a stranded gas field.

The present invention is also directed to providing a method for preparing a synthetic fuel from a stranded gas field through a GTL-FPSO process with high economic feasibility, productivity and efficiency.

The present invention is also directed to providing an apparatus for preparing a synthetic fuel which can be used as an effective system for preparing a synthetic fuel through a GTL-FPSO process.

In an aspect, the present invention provides a method for preparing a synthetic fuel from a natural gas of a stranded gas field through a GTL-FPSO process on a vessel above the stranded gas field, including:

a gas-liquid separation process for separating a $C_5+$ condensate and an oil from a natural gas supplied from a stranded gas field;

a desulfurization process for removing a sulfur component from the separated $C_1$-$C_4$ gas;

a pre-reforming process for converting a $C_2+$ hydrocarbon in the desulfurized gas to methane;

a reforming process for producing a synthesis gas including carbon monoxide and hydrogen by steam carbon dioxide reforming (SCR) of reforming the pre-reformed methane and carbon dioxide included in the stranded gas field with steam;

a reaction catalyst selection process for preparing a reaction catalyst for Fischer-Tropsch reaction of the synthesis gas obtained by the reforming based on the compositional ratio of hydrogen and carbon monoxide included in the synthesis gas; and a Fischer-Tropsch reaction process for performing Fischer-Tropsch reaction of the synthesis gas using the selected reaction catalyst.

In another aspect, the present invention provides, as an apparatus suitable for use in the method for preparing a synthetic fuel, an apparatus for preparing a synthetic fuel from a natural gas of a stranded gas field through a GTL-FPSO process on a vessel above the stranded gas field, including:

a liquid component separator for separating a $C_5+$ condensate and an oil from a natural gas supplied from a stranded gas field;

a desulfurizer for removing a sulfur component from a $C_1$-$C_4$ gas separated by the liquid component separator;

a pre-reformer for converting a hydrocarbon including $C_2$-$C_4$ carbon atoms in the desulfurized gas to methane;

a reforming reactor for producing a synthesis gas including carbon monoxide and hydrogen by steam carbon dioxide reforming (SCR) of reforming the pre-reformed methane and carbon dioxide included in the stranded gas field with steam;

a measurer measuring the compositional ratio of hydrogen and carbon monoxide included in the synthesis gas obtained by the reforming reactor;

a reaction catalyst supplier for supplying a reaction catalyst for Fischer-Tropsch reaction selected based on the measured compositional ratio of hydrogen and carbon monoxide; and a Fischer-Tropsch reactor for performing Fischer-Tropsch reaction using the synthesis gas and the reaction catalyst.

The following effects can be achieved if a synthetic fuel is prepared from a natural gas of a stranded gas field and an associated gas of an oil field through a GTL-FPSO process according to the present invention.

First, carbon dioxide emission (footprint) into the atmosphere can be reduced by combusting the main components of a stranded gas field, methane and carbon dioxide. Since a synthesis gas produced thereby has purity of 75% or higher, it can be used in various fields.

Second, a synthetic fuel obtained from the prepared synthesis gas is an unharmful clean fuel not including sulfur, aromatic metals, etc. It contains diesel oil with a high cetane number at high concentration and is useful as a high-value-added alternative oil such as a jet oil and can be used as an energy source in various applications including a fuel cell.

Third, in an onshore GTL chemical process, air or cooling water is necessary for maintenance of temperature to ensure satisfactory upstream (mainly of reactants) and downstream (mainly of products) flows. Because the preparation method of the present invention is applied for a stranded gas field which is located deep in the sea at a depth of 500 m or deeper, seawater of about 7-12° C. can be used as cooling water.

Fourth, in ATR (autothermal reforming) which is mainly used in an onshore GTL process, an ASU (air separation unit) for separating oxygen from air is necessary and the unit process of ASU such as PSA (pressure swing adsorption) and VSA (vacuum swing adsorption) is of large scale. There is difficulty in applying the ASU to a GTL-FPSO process due to the problems about securing stability of the offshore environment (suddenly changing weather and surging waves) and space for the unit. In the preparation method of the present invention, the problems can be solved through reforming using carbon dioxide and steam.

Fifth, because an improved multi-tubular fixed-bed reactor can be used in an offshore environment instead of the slurry reactor commonly used to prepare a synthetic fuel in an onshore GTL process, safety of the GTL-FPSO system, reliability of the catalytic reactor, utilization of the FPSO space and economic feasibility can be improved.

Sixth, the product produced by the present invention is a clean fuel and operational cost can be reduced because a lot of clean water which is produced as a byproduct can be recycled as a source material of the offshore GTL process.

DETAILED DESCRIPTION OF MAIN ELEMENTS

10: stranded gas field
20: liquid component separator
30: desulfurizer
40: pre-reformer (pre-treater)
50: reforming reactor
60: measurer
70: reaction catalyst supplier
80: Fischer-Tropsch reactor
90: separator/purifier
100: synthetic fuel reservoir
91: collector

DETAILED DESCRIPTION

Hereinafter, an exemplary embodiment of the present invention will be described in more detail.

The present invention relates to a method for preparing a synthetic fuel offshore by preparing a synthesis gas performing reforming using a natural gas extracted from a stranded gas field and carbon dioxide included in the natural gas and then performing a GTL-FPSO process on an FPSO vessel and an apparatus for the method.

The inventors of the present invention have compared and identified the features, merits and demerits of the compact GTL technology using a natural gas from a stranded gas field and the existing GTL technology of preparing a synthetic fuel using a natural gas and have completed the present invention based on the result. The stranded gas field includes an offshore stranded gas field or an offshore stranded oil field.

The present invention provides a method for preparing a synthetic fuel from a stranded gas field using a GTL-FPSO process under a condition optimized for the ratio of carbon dioxide included in the stranded gas field. It is expected that there will be a lot of stranded gas fields with low economic feasibility that have not been identified yet and that the stranded gas fields will be different in composition and carbon dioxide content of natural gas field.

In an exemplary embodiment, the present invention provides a method for preparing a synthetic fuel from a stranded gas field in consideration of the ratio of carbon dioxide included in the stranded gas field.

In the present invention, a synthetic fuel is prepared on a vessel above an offshore stranded gas field by a GTL-FPSO process, specifically through a gas-liquid separation process for separating a condensate and an oil with hydrocarbons containing 5 or more carbons (hereinafter, $C_5+$) from a natural gas including 5-55 vol % of carbon dioxide supplied from the stranded gas field.

Specifically, the method of the present invention is applied selectively to a stranded gas field which includes 5-55 vol % of carbon dioxide in the natural gas supplied from the stranded gas field.

Specifically, in the method for preparing a synthetic fuel from a natural gas according to the present invention, a synthetic fuel is prepared through a gas-liquid separation process, a desulfurization process, a pre-reforming process, a reforming process, a reaction catalyst selection process and a Fischer-Tropsch reaction process.

Hereinafter, the processes of the preparation method according to an exemplary embodiment will be described in detail.

(1) Gas-Liquid Separation Process

This process is for separating a $C_5+$ condensate and an oil from a natural gas supplied from a stranded gas field (separation of liquid component and $C_1$-$C_4$ gas).

In an exemplary embodiment of the present invention, the stranded gas field includes 5-55 vol % of carbon dioxide in the natural gas.

In this process, a liquid hydrocarbon ($C_5+$) with a high boiling point included in the stranded gas field is condensed to obtain a liquid product. This is an important process for ensuring the economic feasibility of the GTL-FPSO technology. It is because critical phase separation in the gas-liquid separation process and a GTL, process should be considered when designing a GTL-FPSO process. In the method of the present invention, the production amount of the liquid fuel product is determined based on the liquid hydrocarbon. Accordingly, the profitability of GTL-FPSO process can be improved by the amount of the $C_5+$ liquid hydrocarbon included in the stranded gas field.

In particular, an accurate gas-liquid separation process ensures the economic feasibility of the preparation process of an offshore GTL fuel by a GTL-FPSO process.

In the gas-liquid separation process, the liquid component (e.g., oil) is separated and stored in a hull and the separated $C_1$-$C_4$ gas is used as a source material for preparing a synthetic fuel according to the present invention.

(2) Desulfurization Process

This process is for removing a sulfur component from the $C_1$-$C_4$ gas separated in the gas-liquid separation process.

The sulfur component included in the stranded gas field should be removed in advance because it acts as a catalytic poison that decreases the activity of the catalyst used in the downstream reforming process.

Specifically, in an exemplary embodiment of the present invention, the desulfurization process is performed such that the sulfur content after the desulfurization process is 1-10 ppm.

(3) Pre-Reforming Process

This process is for converting a higher hydrocarbon with hydrocarbons containing 2 or more carbons (hereinafter, $C_2+$) in the desulfurized gas to methane. Specifically, the $C_2+$ higher hydrocarbon is a $C_2$-$C_4$ higher hydrocarbon.

The stranded gas field includes, in addition to methane as a main component, a $C_2+$ hydrocarbon gas (tailoring gas). Because the $C_2+$ gas causes carbon deposition during reforming reaction, a pre-reforming process for converting to methane is necessary prior to supply to a reforming reactor. Accordingly, this process should be considered when designing the GTL-FPSO process in order to improve the performance of the reforming reactor. In addition, because LPG of the $C_1$-$C_4$ gas can be separated and sold in the LPG market or used as a fuel in the process, only the $C_1$-$C_2$ gas may be supplied to a pre-reformer. The $C_2$+ hydrocarbon is supplied to a catalytic reactor together with water and then converted to methane.

The gas-liquid separation process, the desulfurization process and the pre-reforming process are performed prior to a reforming process to purify the reaction source material.

(4) Reforming Process

This process is for producing a synthesis gas including carbon monoxide and hydrogen by steam carbon dioxide reforming (SCR) of reforming the pre-reformed methane and carbon dioxide included in the stranded gas field with steam. That is to say, in the pre-reforming process, the pre-reformed methane gas and carbon dioxide included in the stranded gas field is reacted with steam. Specifically, a synthesis gas with an adjustable molar ratio of hydrogen ($H_2$) and carbon monoxide (CO) is prepared by reforming the methane with steam and carbon dioxide (SCR; steam carbon dioxide reforming).

The reforming reaction is an endothermic reaction requiring a lot of heat and involves steam reforming of methane, water-gas shift, decomposition of methane, carbon dioxide reforming and reverse water-gas shift. Therefore, in an exemplary embodiment of the present invention, a multi-tubular fixed-bed catalytic reactor may be used to supply a large amount of heat.

Specifically, in an exemplary embodiment of the present invention, the reforming reaction may be performed at high pressure of about 10-30 bar and at 800-1000° C. in order to reduce the size of the required facility on an FPSO vessel. Specifically, during the reforming process, operation conditions such as temperature, pressure and compositional ratio of the source material, in particular, the S/C ratio (steam-to-carbon ratio) are determined and maintained constant depending on the desired composition of the synthesis gas.

Specifically, in the present invention, the S/C ratio of the material may be lowered by recycling the unreacted methane gas to the reforming reaction. Through this, carbon deposition (coke) may be prevented.

In particular, the present invention is advantageous in that stability for an offshore environment can be ensured as compared to the autothermal reforming using oxygen and carbon dioxide emission (footprint) can be reduced. In addition, the SCR reaction is advantageous in that the ratio of hydrogen and carbon monoxide in the synthesis gas suitable for Fischer-Tropsch reaction can be adjusted through a thermodynamic approach. When the stranded gas field has a low carbon dioxide concentration, carbon dioxide collected onshore may be transferred by a carrier to the offshore GTL-FPSO vessel to adjust the $H_2$/CO molar ratio.

In an exemplary embodiment of the present invention, the synthesis gas obtained by the reforming reaction may have a mixing ratio of hydrogen and carbon monoxide ($H_2$/CO) of specifically 1-4. More specifically, the $H_2$/CO ratio may be 1.9-2.1 when a Co-based catalyst is used in the FT process and may be 1-2 when an Fe-based catalyst is used in the FT process.

In the present invention, of the reforming reaction product, water is removed by gas-liquid separation and carbon dioxide is removed to a particular level. The resulting synthesis gas having a specific molar ratio of $H_2$/CO is transferred to an FTS reactor.

(5) Reaction Catalyst Selection Process

This process is for preparing a reaction catalyst for Fischer-Tropsch synthesis (FTS) of the synthesis gas obtained by the reforming reaction based on the optimal compositional ratio of hydrogen and carbon monoxide included in the synthesis gas.

The inventors of the present invention have investigated the compositional ratio of the source material of the synthesis gas ($H_2$ and CO) depending on the ratio of carbon dioxide (5-55 vol %) in the natural gas. The result is shown in Table 1.

TABLE 1

| $CO_2$ content (vol %) | 55% | 45% | 35% | 25% | 15% | 5% |
|---|---|---|---|---|---|---|
| $H_2$/CO (molar ratio) | 1.99 | 2.20 | 2.27 | 2.69 | 3.14 | 3.20 |

The compositional ratio of $H_2$ and CO described in Table 1 is only exemplary and may vary depending on the reforming reaction condition.

From Table 1, it can be seen that the $H_2$/CO compositional ratio decreases as the content of carbon dioxide in the natural gas is higher.

When the stranded gas field has a low carbon dioxide concentration, carbon dioxide collected onshore may be transferred by a carrier to the offshore GTL-FPSO vessel and used as a source material in reaction to adjust the $H_2$/CO molar ratio. In general, when a Co-based FT catalyst is used, a synthesis gas with a $H_2$/CO ratio of 2 is necessary because WGS does not occur. But, when an Fe-based catalyst is used, a synthesis gas with various $H_2$/CO molar ratios may be used for the FT reaction because WGS occurs. Therefore, because the $H_2$/CO molar ratio is determined when the molar ratio of methane, $CO_2$ and water in the SCR reaction is determined, the necessary reaction catalyst may be selected. If necessary, another reaction catalyst may be selected by changing the reaction condition.

The fact that the reaction catalyst selection process is necessary is based on the simulation result of a GTL product showing that the catalyst can be determined based on the $H_2$/CO ratio of the synthesis gas prepared in the reforming process.

The process simulation result is shown in Table 2. Specifically, process simulation results for a cobalt catalyst and an iron catalyst depending on the carbon dioxide ratio of a natural gas are shown in Table 2.

TABLE 2

| | Feed | | | | | | |
|---|---|---|---|---|---|---|---|
| | bbl/d | bbl/d | bbl/d | bbl/d | bbl/d | bbl/d | bbl/d |
| Catalyst type | | Co | | | Fe | | |
| CO2 % | 55 | 45 | 35 | 35 | 25 | 15 | 5 |
| Natural gas [MMscfd] | 200 | 200 | 200 | 200 | 200 | 200 | 200 |
| Steam [kmol/h] | 14000 | 14000 | 12000 | 14000 | 14000 | 16000 | 12000 |
| Gas/Condensate Production | | | | | | | |
| Gas | 3718 | 4120 | 4557 | 1110 | 1145 | 1126 | 1155 |
| Condensate | 408 | 401 | 395 | 395 | 390 | 385 | 381 |
| Gas-to-Liquids Products | | | | | | | |
| Light F-T gases | 1796 | 1990 | 2201 | 5210 | 5378 | 5291 | 5428 |
| Light F-T Liquids | 8372 | 9276 | 10260 | 6110 | 6307 | 6205 | 6365 |

TABLE 2-continued

| | Feed | | | | | | |
|---|---|---|---|---|---|---|---|
| | bbl/d | bbl/d | bbl/d | bbl/d | bbl/d | bbl/d | bbl/d |
| Middle F-T Liquids | 5514 | 6110 | 6757 | 3830 | 3953 | 3890 | 3990 |
| Heavy F-T Liquids(Wax) | 5894 | 6530 | 7222 | 4666 | 4817 | 4738 | 4861 |

From Table 2, it can be seen that the GTL-FPSO process for preparing liquid hydrocarbons as synthetic fuels is affected by process conditions.

In particular, it can be seen that not only the $H_2/CO$ molar ratio but also the distribution of reaction products is greatly affected by the catalyst used in the Fischer-Tropsch reaction.

Therefore, it can be seen that the result of the Fischer-Tropsch reaction can be greatly affected by whether the reaction catalyst used in the reaction is a cobalt catalyst or an iron catalyst.

On the other hand, the result of the reforming process prior to the Fischer-Tropsch reaction depending on the ratio of carbon dioxide included in the stranded gas field affects the operation conditions of the following FTS reaction such as the reaction catalyst, $H_2/CO$ molar ratio, space velocity, temperature, pressure, etc.

To describe this in more detail, when iron(II,III) oxide ($Fe_3O_4$) is used as an iron catalyst in the present invention, various activate phases including iron(II) oxide (FeO), iron (III) oxide ($Fe_2O_3$) and iron carbide ($Fe_3C$) are formed through reduction by hydrogen. In this case, the conversion rate of carbon monoxide is not linear with $H_2/CO$. It is because water-gas shift and Fischer-Tropsch reactions occur competitively in the presence of the iron catalyst. A high conversion rate of carbon monoxide is of great importance because the productivity of liquid hydrocarbons is dependent thereon. The iron catalyst exhibits activity regardless of space velocity or pressure.

In contrast, when cobalt(II,III) oxide ($Co_3O_4$) is used as a cobalt catalyst in the present invention, an active phase is formed as it is converted to cobalt(II) oxide (CoO) and cobalt (Co) through reduction by hydrogen. In this case, the conversion rate of carbon monoxide is more important than when the iron catalyst is used. For example, high productivity of liquid hydrocarbons is achieved when $H_2/CO=2$. This follows the alpha ($\alpha$) value based on the theoretical prediction by the Anderson-Schulz-Flory (ASF) distribution equation. In other cases, the chain reaction is affected differently because adsorption on the catalyst is affected by the ratio of partial pressure of hydrogen and carbon monoxide. However, the $H_2/CO$ molar ratio is not affected because water-gas shift does not occur in a cobalt-based catalyst. And, at a low space velocity, the cobalt catalyst exhibits high activity at intermediate pressure.

In an exemplary embodiment of the present invention, it is possible to select the reaction catalyst for the Fischer-Tropsch reaction by measuring the mixing ratio of hydrogen and carbon dioxide ($H_2/CO$) of the product obtained in the reforming process based on the above-described simulation result. The selection of the reaction catalyst is important because the composition of the natural gas from a stranded gas field changes continuously and it is necessary to improve or convert the catalyst depending on the composition of the source gas.

In an exemplary embodiment of the present invention, in the reaction catalyst selection process, when the $H_2/CO$ mixing ratio is smaller than 2.5, i.e. when $H_2/CO=1.8$-2.2, a cobalt-based catalyst may be used. And, when the $H_2/CO$ mixing ratio is outside the range of 1.8-2.2, an iron-based catalyst may be used.

The reaction catalyst selection process according to the present invention may be affected by the cost of reaction source materials based on the composition of the natural gas of a stranded gas field, plausibility of supply of $CO_2$ from onshore, etc., and the reaction catalyst needs to be selected in consideration of operation conditions and initial investment cost.

In an exemplary embodiment of the present invention, because development of a GTL-FPSO process not including a PSA apparatus for separating hydrogen after the methane reforming process is important in the selection of the FTS catalyst for the FTS process, the reaction catalyst may be selected in a compact GTL-FPSO process in consideration of carbon dioxide content.

In an exemplary embodiment of the present invention, the iron catalyst may be used under a relatively strict, broad condition of $H_2/CO=2$ and the cobalt catalyst may be used under a relatively gentle, restricted condition.

In accordance with the present invention, when the Fischer-Tropsch reaction is performed for the synthesis gas obtained in the reforming process, the adequately selected reaction catalyst can greatly improve the efficiency of the Fischer-Tropsch reaction process.

Also, in an exemplary embodiment of the present invention, the selection of the reaction catalyst for the Fischer-Tropsch reaction is important because the concentration of carbon dioxide included in the natural gas of the stranded gas field may change with time and the $H_2/CO$ molar ratio of the synthesis gas may be adjusted by supplying carbon dioxide from onshore to the SCR reaction.

(6) Fischer-Tropsch Reaction Process

This process is for performing Fischer-Tropsch reaction of the synthesis gas using the selected reaction catalyst.

In this process, a synthetic fuel is prepared by reacting the synthesis gas obtained in the reforming process using the reaction catalyst selected in the reaction catalyst selection process.

In an exemplary embodiment of the present invention, the Fischer-Tropsch reaction may be performed by one or more selected from a reaction using a cobalt-based catalyst, a reaction using an iron-based catalyst and a reaction using a cobalt- and iron-based catalyst. In an exemplary embodiment of the present invention, the reaction may be selected depending on the initial carbon dioxide content in the stranded gas field or the content of carbon dioxide and hydrogen after the reforming reaction. But, because the content of carbon dioxide in the natural gas may change with time, the catalyst may be changed during recycling or exchange to produce final clean fuel products with uniform compositions.

In the present invention, the Fischer-Tropsch reaction is performed in the presence of the selected reaction catalyst. Specifically, in the presence of a Co-based catalyst, the Fischer-Tropsch reaction may be performed at low temperature of 200-240° C. at 20-25 bar. Specifically, the reaction condition may be determined in consideration of the deactivation of the catalyst, the size of the GTL-FPSO process flow line, etc.

In an exemplary embodiment of the present invention, the gas recycled in the processes of the present invention as a tail gas may include unreacted hydrogen, carbon monoxide, a $C_1$-$C_4$ hydrocarbon, etc. Specifically, the amount of the recycled gas may be limited to 50 vol % or less.

The liquid carbon product prepared by the Fischer-Tropsch reaction according to the present invention may be used as a clean fuel for transportation.

(7) Additional Processes

The synthetic fuel prepared according to the present invention may further pass through a separation/purification process after the Fischer-Tropsch reaction process.

A high boiling point, long-chain hydrocarbon product such as a wax produced in the FTS process may be cracked, for example, by a hydrogenation upgrading process and then separated using a distillation tower.

In an exemplary embodiment of the present invention, the separated and purified liquid carbon compound may be immediately used as a fuel and a light hydrocarbon may be separated and all or part of it may be recycled.

In an exemplary embodiment of the present invention, all or part of the gas separated in the separation/purification process may be recycled to one or more process selected from a group consisting of the pre-reforming process, the reforming process and the Fischer-Tropsch reaction process.

In an exemplary embodiment of the present invention, in the separation/purification process, a carbon compound with low fluidity such as a wax, water, etc. may be separated separately. The separated compound with low fluidity such as a wax may be collected and separated as gasoline, kerosene or diesel through an upgrading process.

All or part of the gas separated after the upgrading process may be recycled as described above.

And, in an exemplary embodiment of the present invention, water produced or separated during the process may be recycled to a process where water is required.

In another exemplary embodiment of the present invention, the separated and purified synthetic fuel may be separated on the FPSO vessel as a clean fuel as the final product or may be transferred onshore as a crude GTL fuel and then supplied to the market after separation and purification in an oil refinery into a final product.

The liquid fuel prepared as gasoline or diesel according to the present invention may be immediately used as a fuel for transportation in a vehicle or a ship or may be used as a source material of a petrochemical synthetic product after passing through a reprocessing process.

The method for preparing a synthetic fuel according to the present invention is suitable for a GTL-FPSO process using a natural gas from an offshore stranded gas field.

The present invention also provides an apparatus suitable to be applied to the method for preparing a synthetic fuel according to the present invention.

Figure 1:
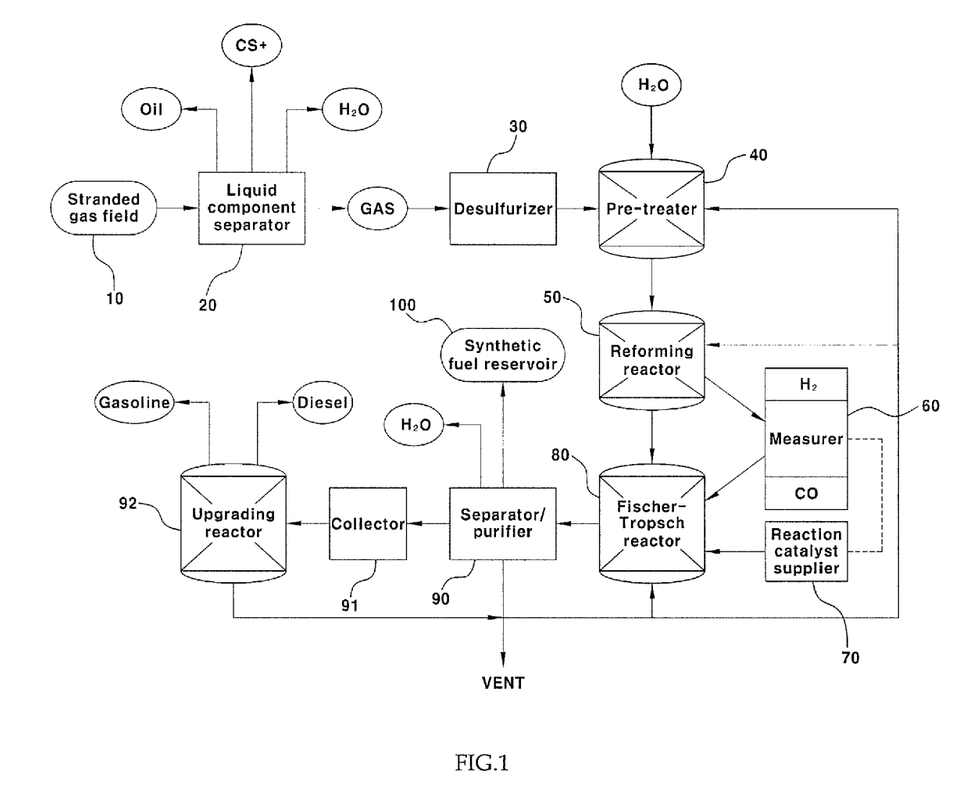
FIG. 1 is a schematic of an apparatus for preparing a synthetic fuel from a stranded gas field using a GTL-FPSO process according to an exemplary embodiment of the present invention.

A schematic of the apparatus for preparing a synthetic fuel using a natural gas of a stranded gas field by a GTL-FPSO process according to an exemplary embodiment of the present invention is shown in FIG. 1. Here, parts of each apparatus may include functions according to the prevent invention, but some convenient systems may be included or omitted.

As shown in FIG. 1, the apparatus suitable for preparing a synthetic fuel using a natural gas of a stranded gas field by a GTL-FPSO process according to the present invention includes:

a liquid component separator 20 for separating a $C_5+$ condensate and an oil from a natural gas supplied from a stranded gas field 10;

a desulfurizer 30 for removing a sulfur component from a $C_1-C_4$ gas separated by the liquid component separator 20;

a pre-reformer (pre-treater) 40 for converting a $C_2+$ hydrocarbon in the desulfurized gas to methane;

a reforming reactor 50 for producing a synthesis gas including carbon monoxide and hydrogen by steam carbon dioxide reforming of reforming the pre-reformed methane and carbon dioxide included in the stranded gas field with steam;

a measurer 60 measuring the compositional ratio of hydrogen and carbon monoxide included in the synthesis gas obtained in the reforming reactor 50;

a reaction catalyst supplier 70 for supplying a reaction catalyst for Fischer-Tropsch reaction selected based on the measured compositional ratio of hydrogen and carbon monoxide; and a Fischer-Tropsch reactor 80 for performing Fischer-Tropsch reaction of the synthesis gas using the reaction catalyst.

It may further include a separator/purifier 90 for separating and purifying the product obtained in the Fischer-Tropsch reactor 80.

In the figure, 100 denotes a synthetic fuel reservoir for storing a liquid hydrocarbon as the final product.

The apparatus according to the present invention may be used to prepare a synthetic fuel through the processes described above.

In an exemplary embodiment of the present invention, the measurer 60 may include a synthesis gas analyzer capable of detecting the content of hydrogen and carbon dioxide.

And, the separator/purifier 90 may be equipped with a vent for discharging the separated and purified gas. All or part of the separated gas may be transferred to one or more of the pre-reformer (pre-treater) 40, the reforming reactor 50 or the Fischer-Tropsch reactor 80 for recycling.

In another exemplary embodiment of the present invention, the hydrocarbon compound with low fluidity such as a wax may be collected separately by a collector 91 and then transferred to an upgrading reactor 92 for converting the hydrocarbon compound with low fluidity to gasoline, kerosene or diesel. A supply line may be equipped to recycle all or part of a $C_1-C_4$ gas produced by the upgrading reactor 92.

Figure 2:
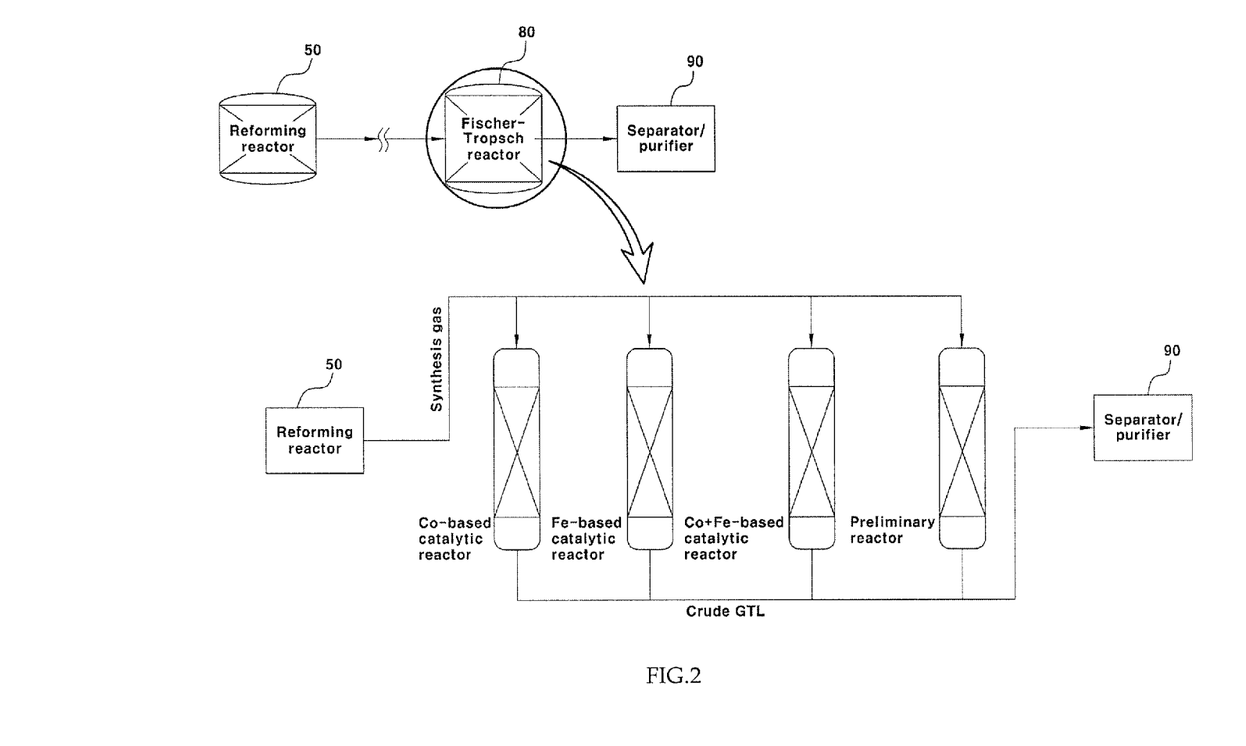
FIG. 2 is a schematic of a Fischer-Tropsch reactor of the apparatus according to an exemplary embodiment of the present invention shown in FIG. 1.

In an exemplary embodiment of the present invention, the Fischer-Tropsch reactor may include a cobalt (Co)-based catalytic reactor, an iron (Fe)-based catalytic reactor and a cobalt- and iron-based (Co+Fe) catalytic reactor as shown in FIG. 2 and may further include a preliminary reactor. The Fischer-Tropsch reactor is configured such that the Fischer-Tropsch reaction can be performed in a reactor selected from the above catalytic reactors based on the compositional ratio of the synthesis gas supplied to the Fischer-Tropsch reactor. The preliminary reactor may be loaded with a catalyst in order to respond to the compositional change of the natural gas. A separation/purification process may be additionally performed after the Fischer-Tropsch reaction.

The apparatus according to the present invention may be configured to be suitable for application to the method for preparing a synthetic fuel according to the present invention and an additional equipment may be further provided.

In an exemplary embodiment of the present invention, when a synthetic fuel is prepared from a natural gas of a stranded gas field by a GTL-FPSO process using the method or apparatus of the present invention, carbon dioxide emission (footprint) into the atmosphere can be reduced and a synthetic fuel as a clean fuel not including sulfur, aromatic metals, etc. may be prepared in an environment-friendly manner.

In addition, a high-value-added product can be prepared economically from an inexpensive natural gas of an offshore stranded gas field or oil field on an offshore FPSO vessel.

In particular, when a synthetic fuel is produced from a stranded gas field, it may be necessary to change the Fischer-Tropsch reaction catalyst because the composition of the synthesis gas prepared from the natural gas of the stranded gas field may change with time. Accordingly, the method and apparatus which make it possible to select the catalyst by measuring the carbon dioxide content of the natural gas enables continuous production of the synthesis gas and maximized utilization of the synthesis gas under an optimized condition.

The preparation method and apparatus according to the present invention enable preparation of a clean fuel offshore using a natural gas from a small-to-medium sized offshore stranded gas field and from an associated gas of an offshore oil field. They are commercially applicable to the existing FPSO vessels and are expected to predominate in the global market.

The GTL-FPSO process according to the present invention, which solves the problems of the compositional change of a natural gas from a stranded gas field under a restricted condition of an offshore environment and the flaring and waste of an associated gas, enables preparation of a clean fuel with high carbon efficiency and enables selection of a reaction catalyst capable of reducing greenhouse gas emission, is highly likely to be commercially applicable as a next-generation clean fuel preparation process.

What is claimed is:

1. A method for preparing a synthesis gas from a natural gas of a stranded gas field and associated gas from oil & gas fields through a GTL-FPSO process on a vessel above the stranded gas field and oil and gas fields, comprising:
    separating gas phase hydrocarbons and an oil with hydrocarbons containing 5 or more carbons from a natural gas supplied from the stranded gas field;
    removing a sulfur component from a separated $C_1$-$C_4$ gas to form a desulfurized gas;
    converting a $C_2$+ higher hydrocarbon in the desulfurized gas to a pre-reformed methane;
    producing a synthesis gas comprising carbon monoxide and hydrogen by steam carbon dioxide reforming (SCR) of the pre-reformed methane and carbon dioxide included in the stranded gas field with steam;
    preparing a reaction catalyst based on the compositional ratio of hydrogen and carbon monoxide included in the synthesis gas and the volume of unreacted carbon dioxide in the natural gas supplied from the stranded gas field; and
    performing a Fischer-Tropsch reaction of the synthesis gas using the reaction catalyst,
    wherein the method further comprises separating and purifying a crude GTL fuel from a liquid hydrocarbon compound or a wax with low fluidity after the Fischer-Tropsch reaction process to separately recover gasoline and diesel.

2. The method according to claim 1, wherein the stranded gas field and associated gas comprises 5-55 vol % of carbon dioxide in the natural gas.

3. The method according to claim 1, wherein the Fischer-Tropsch reaction is selected from one or more of a reaction using a cobalt-based catalyst, a reaction using an iron-based catalyst and a reaction using a cobalt- and iron-based catalyst.

4. The method according to claim 1, wherein the reaction catalyst is selected depending on the initial carbon dioxide content in the stranded gas field and associated gas or the content of carbon monoxide and hydrogen in the synthesis gas after the reforming reaction.

5. The method according to claim 1, wherein a Fischer-Tropsch reactor is configured such that the Fischer-Tropsch reaction can be performed in a reactor selected from a cobalt (Co)-based catalytic reactor, an iron (Fe)-based catalytic reactor and a cobalt- and iron-based (Co—Fe) catalytic reactor using the catalyst selected based on the compositional ratio of the synthesis gas supplied to the Fischer-Tropsch reactor.

6. The method according to claim 5, wherein the Fischer-Tropsch reactor further comprises a cobalt- and iron-based catalytic reactor as a preliminary reactor.

7. The method according to claim 1, wherein, in the reaction catalyst selection process, a cobalt-based catalyst is used if the compositional ratio of hydrogen and carbon monoxide ($H_2$/CO) of the synthesis gas is 1.8-2.2 and an iron-based catalyst is used if the molar ratio is outside the range.

8. The method according to claim 1, wherein, in the separation/purification process, all or part of the separated $C_1$-$C_4$ gas is recycled to one or more process selected from the pre-reforming process, the reforming process and the Fischer-Tropsch reaction process.

9. The method according to claim 1, wherein the carbon compound or wax with low fluidity separated in the separation/purification process is collected and separated as gasoline, kerosene or diesel through an upgrading process.

* * * * *